United States Patent
Lee et al.

(10) Patent No.: US 10,396,385 B2
(45) Date of Patent: Aug. 27, 2019

(54) ION EXCHANGING MEMBRANE, METHOD FOR MANUFACTURING THE SAME, AND ENERGY STORAGE DEVICE COMPRISING THE SAME

(71) Applicant: KOLON INDUSTRIES, INC., Seoul (KR)

(72) Inventors: Eun-Su Lee, Yongin-si (KR); Dong-Hoon Lee, Yongin-si (KR); Na-Young Kim, Yongin-si (KR); Seung-Jib Yum, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 0 days.

(21) Appl. No.: 16/079,214

(22) PCT Filed: Mar. 5, 2018

(86) PCT No.: PCT/KR2018/002580
§ 371 (c)(1),
(2) Date: Aug. 23, 2018

(87) PCT Pub. No.: WO2018/182191
PCT Pub. Date: Oct. 4, 2018

(65) Prior Publication Data
US 2018/0351192 A1   Dec. 6, 2018

(30) Foreign Application Priority Data

Mar. 31, 2017 (KR) .......................... 10-2017-0041699
Mar. 5, 2018 (KR) .......................... 10-2018-0025675

(51) Int. Cl.
*H01M 8/10* (2016.01)
*H01M 8/106* (2016.01)
(Continued)

(52) U.S. Cl.
CPC ......... *H01M 8/106* (2013.01); *H01M 8/1032* (2013.01); *H01M 8/1062* (2013.01);
(Continued)

(58) Field of Classification Search
CPC .. H01M 8/106; H01M 8/1032; H01M 8/1062; H01M 8/188; H01M 8/1083
(Continued)

(56) References Cited

U.S. PATENT DOCUMENTS 5,167,765 A    12/1992 Nielson et al.
2008/0038976 A1   2/2008 Berrigan et al.
(Continued)

FOREIGN PATENT DOCUMENTS

EP          0 900 249 B1    10/2003
KR    10-2011-0006122 A     1/2011
(Continued)

OTHER PUBLICATIONS

Korean Intellectual Property Office; Communication dated Mar. 25, 2019 in corresponding Application No. 10-2018-0025675.

*Primary Examiner* — Michael Bernshteyn
(74) *Attorney, Agent, or Firm* — Sughrue Mion, PLLC (57) ABSTRACT

The present invention relates to an ion exchange membrane, a method for manufacturing the same, and an energy storage device including the same, and the ion exchange membrane includes a porous support including a plurality of pores and an ion conductor filling the pores of the porous support, in which the porous support includes micropores having a size of 31 to 1000 μm. The ion exchange membrane may achieve high energy efficiency in the case of being applied to an energy storage device such as a vanadium redox inflow battery due to high charge/discharge cycle durability, high ion-conductivity, and excellent chemical and thermal stability.

14 Claims, 6 Drawing Sheets

(51) Int. Cl.
  *H01M 8/1032* (2016.01)
  *H01M 8/1062* (2016.01)
  *H01M 8/18* (2006.01)
  *H01M 8/1069* (2016.01)
  *H01M 8/1018* (2016.01)

(52) U.S. Cl.
  CPC ......... *H01M 8/1083* (2013.01); *H01M 8/188* (2013.01); *H01M 2008/1095* (2013.01); *H01M 2300/0082* (2013.01); *Y02E 60/528* (2013.01)

(58) Field of Classification Search
  USPC .......................................................... 521/27
  See application file for complete search history.

(56) References Cited

U.S. PATENT DOCUMENTS

| | | |
|---|---|---|
| 2008/0233454 A1 | 9/2008 | Capron et al. |
| 2010/0167100 A1 | 7/2010 | Moore et al. |

FOREIGN PATENT DOCUMENTS

| | | | |
|---|---|---|---|
| KR | 20110006122 A | * | 1/2011 |
| KR | 10-2012-0021517 A | | 3/2012 |
| KR | 20120021517 A | * | 3/2012 |
| KR | 1020120021517 A | * | 3/2012 |
| KR | 10-2012-0060327 A | | 6/2012 |
| KR | 20120060327 A | * | 6/2012 |
| KR | 1020120060327 A | * | 6/2012 |
| KR | 10-1214399 B1 | | 12/2012 |
| KR | 10-2013-0078498 A | | 7/2013 |
| KR | 20130078498 A | * | 7/2013 |
| KR | 1020130078498 A | * | 7/2013 |
| KR | 10-1440829 B1 | | 9/2014 |
| KR | 20140118914 A | * | 10/2014 |
| KR | 10-1522256 B1 | | 5/2015 |
| KR | 10-2014-0044468 A | | 10/2015 |
| KR | 10-2016-0038851 A | | 4/2016 |
| KR | 10-2016-0128531 A | | 11/2016 |
| KR | 20160128531 A | * | 11/2016 |
| WO | 2012/075810 A1 | | 6/2012 |
| WO | 2013/027758 A1 | | 2/2013 |
| WO | 2014/034415 A1 | | 3/2014 |
| WO | 2014/099874 A1 | | 6/2014 |

* cited by examiner

ION EXCHANGING MEMBRANE, METHOD FOR MANUFACTURING THE SAME, AND ENERGY STORAGE DEVICE COMPRISING THE SAME

CROSS REFERENCE TO RELATED APPLICATIONS

This application is a National Stage of International Application No. PCT/KR2018/002580, filed on Mar. 5, 2018, which claims priority from Korean Patent Application No. 10-2017-0041699, filed on Mar. 31, 2017, and Korean Patent Application No. 10-2018-0025675, filed on Mar. 5, 2018.

TECHNICAL FIELD

The present invention relates to an ion exchange membrane, a method for manufacturing the same, and an energy storage device including the same, and more particularly, to an ion exchange membrane, a method for manufacturing the same, and an energy storage device including the same capable of achieving high energy efficiency in the case of being applied to an energy storage device such as a vanadium redox inflow battery due to high charge/discharge cycle durability, high ion-conductivity, and excellent chemical and thermal stability.

BACKGROUND ART

Efforts are being made to save fossil fuels or to apply renewable energy to more fields by improving the use efficiency to solve the problem of depletion of fossil fuels and environmental pollution.

Renewable energy sources such as solar heat and wind power have been used more efficiently than before, but these energy sources are intermittent and unpredictable. Due to these characteristics, their dependence on these energy sources is limited, and a ratio of renewable energy sources to the current primary power sources is very low.

Since a rechargeable battery provides a simple and efficient method for storing electric power, the rechargeable battery have been miniaturized to increase its mobility, and efforts to utilize the rechargeable battery as power sources for small home appliances such as an intermittent auxiliary power source, a laptop, a tablet PC, and a mobile phone have continued.

Among them, a redox flow battery (RFB) is a secondary battery capable of storing energy for a long time by repeating charging and discharging by an electrochemical reversible reaction of an electrolyte. A stack and an electrolyte tank, which depend on the capacity and output characteristics of the battery, are independent of each other, so that a battery design is free and limitation of an installation space is small.

In addition, the redox flow battery has a load leveling function installed in a power plant, a power system, and a building to cope with an abrupt increase in power demand, a function of compensating or suppressing a power failure or an instantaneous undervoltage, and the like. The redox flow battery is a very powerful storage technology capable of being freely combined if necessary, and a system suitable for large-scale energy storage.

The redox flow battery generally consists of two separated electrolytes. One electrolyte stores an electric active material in an anode reaction and the other electrolyte is used for a cathode reaction. In an actual redox flow battery, the electrolyte reaction is different between the cathode and the anode and there is a flow phenomenon of the electrolyte solution, so that a pressure difference occurs between the cathode side and the anode side. In an all vanadium-based redox flow battery as a representative redox flow battery, reactions of the cathode and anode electrolytes are shown in the following Reaction Formulas 1 and 2, respectively.

[Reaction Formula 1]

$$VO^{2+} \underset{\text{discharge}}{\overset{\text{charge}}{\rightleftarrows}} VO_2^+$$

[Reaction Formula 2]

$$V^{2+} \underset{\text{charge}}{\overset{\text{discharge}}{\rightleftarrows}} V^{3+}$$

Therefore, in order to overcome the pressure difference between the both electrodes and to exhibit excellent cell performance even if charging and discharging are repeated, an ion exchange membrane having improved physical and chemical durability is required. In the redox flow battery, the ion exchange membrane is a core material accounting for about 10% of the system.

As such, in the redox flow battery, the ion exchange membrane is a main component for determining the lifespan and price of the battery. In order to commercialize the redox flow battery, a low crossover of vanadium ions is required due to high ion selective permeability of the ion exchange membrane, high ion-conductivity is required due to low electrical resistance, and a low price is required in addition to mechanical and chemical stability and high durability.

Meanwhile, currently, polymer electrolyte membranes commercialized as ion exchange membranes have been used for tens of years and have been continuously studied. Recently, as a mediator that transfers ions used in a direct methanol fuel cell (DMFC), a polymer electrolyte membrane fuel cell (proton exchange membrane fuel cell, PEMFC), a redox flow battery, water purification, and the like, many studies on the ion exchange membrane has been actively conducted.

Currently, a widely used material for the ion exchange membrane is a Nafion™-based membrane, which is a perfluorinated sulfonic acid group-containing polymer manufactured by DuPont in USA. At a saturated moisture content, the membrane has ion-conductivity of 0.08 S/cm at room temperature and excellent mechanical strength and chemical resistance and has stable performance as an electrolyte membrane for use in automotive fuel cells. Further, as similar types of commercial membranes, there are an Aciplex-S membrane from Asahi Chemicals, a Dow membrane from Dow Chemicals, a Flemion membrane from Asahi Glass, a GoreSelcet membrane from Gore & Associate, and the like. In the Ballard Power System, Canada, alpha or beta types of perfluorinated polymers have been developed and studied.

However, the membranes have disadvantages of not only having a difficulty in mass production due to a high price and a complicated synthesis method but also greatly lowering efficiency as the ion exchange membrane such as a crossover phenomenon and low ion-conductivity at a high temperature or a low temperature in an electric energy system such as a redox flow battery.

PRIOR ARTS

Patent Document

Korean Patent Application No. 2014-0044468
Korean Patent Registration No. 1522256
Korean Patent Registration No. 1440829
Korean Patent Registration No. 1214399

DISCLOSURE

Technical Problem

An object of the present invention is to provide an ion exchange membrane for an energy storage device capable of achieving high energy efficiency in the case of being applied to an energy storage device such as a vanadium redox inflow battery due to high charge/discharge cycle durability, high ion-conductivity, and excellent chemical and thermal stability.

Another object of the present invention is to provide a method for manufacturing the ion exchange membrane.

Yet another object of the present invention is to provide an energy storage device including the ion exchange membrane.

Technical Solution

According to an embodiment of the present invention, there is provided an ion exchange membrane comprising: a porous support including a plurality of pores; and an ion conductor filling the pores of the porous support, in which the porous support includes micropores having a size of 31 to 1000 µm.

The porous support may include 1 to 20 vol % of the micropores having a size of 31 to 1000 µm with respect to the total volume of the pores.

A porosity of the porous support may be 45% or higher.

A thickness of the porous support may be 1 to 200 µm.

The ion conductor may be contained with 30 to 70 wt % with respect to the total weight of the ion exchange membrane.

The ion exchange membrane may further include an ion conductor layer located on one surface or both surfaces of the porous support, in which a thickness of the ion conductor layer on one surface may be 1 to 30 µm.

The thickness of the ion conductor layer on one surface may be 1 to 50 length % with respect to the total thickness of the ion exchange membrane.

The porous support may be formed of a plurality of fibers randomly oriented.

According to another embodiment of the present invention, there is provided a method for manufacturing an ion exchange membrane comprising: preparing a porous support including a plurality of pores; and filling an ion conductor in the pores of the porous support, in which the porous support includes micropores having a size of 31 to 1000 µm.

The preparing of the porous support may be performed by any one method selected from the group consisting of carding, garneting, air-laying, wet-laying, melt blowing, spunbonding, and stitch bonding.

The filling of the ion conductor in the pores of the porous support may include preparing the ion conductor in a sheet shape by coating, and melt-impregnating the sheet-shaped ion conductor into the pores of the porous support.

The melt-impregnating may be performed at 150 to 240° C. in a pressure of 1 to 20 MPa.

According to yet another embodiment of the present invention, there is provided an energy storage device comprising the ion exchange membrane.

The energy storage device may be a fuel cell.

The energy storage device may be a redox flow battery.

Advantageous Effects

According to the ion exchange membrane of the present invention, it is possible to achieve high energy efficiency in the case of being applied to an energy storage device such as a vanadium redox inflow battery due to high charge/discharge cycle durability, high ion-conductivity, and excellent chemical and thermal stability.

Particularly, the ion exchange membrane is a reinforced composite membrane type ion exchange membrane in which an ion conductor is filled in pores of a porous support having micropores, and it is possible to generate sufficient efficiency even if the ion conductor is contained with a smaller content or an ion conductor layer is formed with a smaller thickness by using the porous support having the micropores, and it is possible to improve overall efficiency by reducing the resistance through a reduction in thickness of the overall ion exchange membrane.

Further, when the reinforced composite membrane using the porous support having the micropores is compared with a reinforced composite membrane using a porous support having nanopores, the content of the ion conductor may be reduced in the entire reinforced composite membrane to obtain an effect of reducing a swelling ratio and a dimensional change amount of the ion exchange membrane, thereby improving the durability.

Further, compared with a perfluorinated membrane commonly used or a reinforced composite membrane using a porous support having nanopores, there is an economical advantage due to a relatively low price.

According to the method for manufacturing the ion exchange membrane of the present invention, it is possible to prevent the shape of the ion exchange membrane from being deformed even in the case of using the porous support having the micropores and to ensure the morphological stability of the ion exchange membrane.

BEST MODE FOR INVENTION

An ion exchange membrane according to an embodiment of the present invention includes a porous support having a plurality of pores, and an ion conductor filled in the pores of the porous support, in which the porous support includes micropores

MODE FOR INVENTION

Hereinafter, embodiments of the present invention will be described in detail so as to be easily implemented to those skilled in the art. However, the present invention can be realized in various different forms, and is not limited to the exemplary embodiments described herein.

An ion exchange membrane according to an embodiment of the present invention includes a porous support having a plurality of pores, and an ion conductor filled in the pores of the porous support, in which the porous support includes micropores.

The porous support may be a nonwoven fibrous web formed of a plurality of fibers which are randomly oriented.

The nonwoven fibrous web is interlaid, but refers to a sheet having a structure of individual fibers or filaments instead of the same manner as a woven fabric. The nonwoven fibrous web may be prepared by a method such as wet-laying to be described below.

The basic weigh of the nonwoven fibrous web may be 5 to 30 g/m². If the basic weight of the nonwoven fibrous web is less than 5 g/m², it may be difficult to function as a porous support due to the formation of visible pores, and it may be difficult to manufacture an ion exchange membrane in the form of a reinforced composite membrane by a melt impregnation method. If the basic weigh is more than 30 g/m², the ion exchange membrane may be manufactured in the form of paper or a fabric in which pores are almost not formed.

The fiber may include one or higher polymeric materials, and generally, any material used as fiber-forming polymeric materials may be used, and specifically, hydrocarbon-based fiber-forming polymeric materials may be used. For example, the fiber-forming polymeric material may include any one selected from the group consisting of polyolefins such as polybutylene, polypropylene and polyethylene; polyesters such as polyethylene terephthalate and polybutylene terephthalate; polyamides (nylon-6 and nylon-6,6); polyurethane; polybutene; polylactic acid; polyvinyl alcohol; polyphenylene sulfide; polysulfone; a fluid crystalline polymer; polyethylene-co-vinyl acetate; polyacrylonitrile; cyclic polyolefin; polyoxymethylene; a polyolefinic thermoplastic elastomer; and combinations thereof.

Meanwhile, the porous support includes micropores.

The shape of the micropore is not particularly limited and may be a random shape, for example, the shape may include both an elongated shape and a randomly shaped sphere.

The micropore refers to a pore having a size of 1 to 1000 µm. The porous support may have micropores having a size of 31 to 1000 µm, and more specifically, micropores having a size of 31 to 700 µm.

The porous support may contain 1 to 20 vol % of the micropores having the size of 31 to 1000 µm, specifically 1 to 10 vol %, and more specifically 3 to 10 vol %, with respect to the total volume of the pores.

Generally, when the size of the micropore is more than 30 µm, it may be difficult to use a wet impregnation process in the manufacture of the ion exchange membrane, but in the present invention, it is possible to manufacture a porous support containing pores having a size of more than 30 µm by using a melt impregnation method. However, since the pores having a size of several hundreds of micrometers are formed in such a large pore size as to be visible, it is difficult to use such a porous support in the manufacture of the ion exchange membrane, but in the present invention, the distribution of micropores having a size of 31 to 1000 µm is limited to 1 to 20 vol %, so that the above problems may be solved.

The size of the micropore may be measured by a pore-size measurement method using a capillary flow porometer (CFP). At this time, the measurement area is a circle with a diameter of 25 mm, and the measurement method may be a wet up dry down method. The CFP is a method for measuring the size of the pore by naturally filling the pores with a liquid that does not react with a sample, generating a flow of gas between the pores while removing the liquid by the pressure of the non-reactive gas, and then measuring the gas flow difference and the pressure difference. Since the measurement method of the pore size using the CFP is well known, a detailed description thereof will be omitted.

The porosity of the porous support may be 45% or higher and specifically 60% or higher. Meanwhile, the porous support preferably has a porosity of 90% or less. If the porosity of the porous support is more than 90%, the morphology stability may be lowered so that the post-treatment may not proceed smoothly. The porosity may be calculated by a ratio of the volume of air to the total volume of the porous support according to the following Equation 1. At this time, the total volume is calculated by manufacturing a rectangular sample and measuring the width, length, and thickness of the rectangular sample, and the air volume may be obtained by subtracting the volume of the polymer inversely calculated from the density after measuring the mass of the sample from the total volume.

Porosity (%)=(air volume in porous support/total volume of porous support)×100  [Equation 1]

On the other hand, since the micropores of the porous support are filled with the ion conductor, the porosity of the ion exchange membrane may be 0 to 10%. It is preferable that the ion exchange membrane does not include the micropores by filling all of the micropores of the porous support with the ion conductor.

The thickness of the porous support may be 1 to 200 µm, and specifically 10 to 50 µm. If the thickness of the porous support is less than 1 µm, the mechanical strength may be lowered, and if the thickness is more than 200 µm, the resistance loss may increase, and the light weight and integration may be lowered.

The ion exchange membrane is an ion exchange membrane in the form of a reinforced composite membrane filled with the ion conductor in the pores of the porous support including the micropores.

The ion conductor may be a cation conductor having a cation exchange group such as a proton, or an anion conductor having an anion exchange group such as hydroxyl ions, carbonate or bicarbonate.

The cation exchange group may be any one selected from the group consisting of a sulfonic acid group, a carboxyl group, a boronic acid group, a phosphoric acid group, an imide group, a sulfonimide group, a sulfonamide group and combinations thereof, and may be generally a sulfonic acid group or a carboxyl group.

The cation conductor includes the cation exchange group, and may include fluorine-based polymers containing fluorine in a main chain; hydrocarbon-based polymers such as benzimidazole, polyimide, polyamideimide, polyimide, polyacetal, polyethylene, polypropylene, an acrylic resin, polyester, polysulfone, polyether, polyetherimide, polyethersulfone, polycarbonate, polystylene, polyphenylene sulfide, polyetherether ketone, polyether ketone, polyaryl ether sulfone, polyphosphazene or polyphenylquinoxaline; partially fluorinated polymers such as a polystyrene-graft-ethylene tetrafluoroethylene copolymer, or a polystyrene-graft-polytetrafluoroethylene copolymer; sulfonimide, and the like.

More specifically, when the cation conductor is a hydrogen-ion cation conductor, the polymers may include a cation exchange group selected from the group consisting of a sulfonic acid group, a carboxylic acid group, a phosphoric acid group, a phosphonic acid group and derivatives thereof in a side chain. Specific examples of the cation conductor may include fluorine-based polymers including poly(perfluorosulfonic acid), poly(perfluorocarboxylic acid), a copolymer of tetrafluoroethylene and fluorovinyl ether containing sulfonic acid groups, defluorinated sulfated polyether ketone or mixtures thereof; and hydrocarbon-based polymers sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene and mixtures thereof, but the present invention is not limited thereto.

More specifically, the cation conductor may include a hydrophilic region including a repeating unit represented by the following Chemical Formula 1 and a hydrophobic region including a repeating unit represented by the following Chemical Formula 2.

[Chemical Formula 1]

In Chemical Formula 1, the A is an ion conducting group, and the ion conducting group may be any cation conducting group selected from the group consisting of a sulfonic acid group, a carboxylic acid group, and a phosphoric acid group, and the cation conducting group may be preferably a sulfonic acid group. The ion conducting group may be an anion conducting group such as an amine group.

In Chemical Formula 1 above, the $R^{11}$ to $R^{16}$ may each independently be any one selected from the group consisting of a hydrogen atom, a halogen atom, an ion conducting group, an electron donation group, and an electron withdrawing group.

The halogen atom may be any one selected from the group consisting of bromine, fluorine, and chlorine.

The ion conductive group may be any one cation conducting group selected from the group consisting of a sulfonic acid group, a carboxylic acid group, and a phosphoric acid group, and the cation conducting group may be preferably a sulfonic acid group. The ion conducting group may be an anion conducting group such as an amine group.

In addition, the electron donation group may be any one selected from the group consisting of an alkyl group, an allyl group, an aryl group, an amino group, a hydroxyl group, and an alkoxy group as an organic group for releasing electrons, and the electron withdrawing group may be any one selected from the group consisting of an alkylsulfonyl group, an acyl group, a halogenated alkyl group, an aldehyde group, a nitro group, a nitroso group and a nitrile group as an organic group for attracting electrons.

The alkyl group may be a methyl group, an ethyl group, a propyl group, a butyl group, an isobutyl group, an amyl group, a hexyl group, a cyclohexyl group, an octyl group, or the like, and the halogenated alkyl group may be a trifluoromethyl group, a pentafluoroethyl group, a perfluoroethyl group, a perfluoropropyl group, a perfluorobutyl group, a perfluoropentyl group, a perfluorohexyl group, or the like, and the allyl group may be a prophenyl group or the like, and the aryl group may be a phenyl group, a pentafluorophenyl group, or the like. The perfluoroalkyl group refers to an alkyl group in which some of hydrogen atoms or all of hydrogen atoms are substituted with fluorine.

In Chemical Formula 1 above, the $X^1$ may be a single bond or a divalent organic group. The bivalent organic group is a bivalent organic group which attracts electrons or releases electrons, and specifically, may be any one selected from the group consisting of —CO—, —SO$_2$—, —CONH—, —COO—, —CR'$_2$—, —(CH$_2$)$_n$—, —C(CH$_3$)$_2$—, —C(CF$_3$)$_2$—, a cyclohexylidene group, a cyclohexylidene group containing an ion conducting group, a fluorenylidene group, and a fluorenylidene group containing an ion conducting group. Here, the R' is any one selected from the group consisting of a hydrogen atom, a halogen atom, an alkyl group, and a halogenated alkyl group, and the n may be an integer of 1 to 10. When the $X^1$ is a single bond, it is meant that phenyl groups existing on both sides of the X are directly bound, and as a representative example thereof, a biphenyl group may be included.

In Chemical Formula 1 above, the $Z^1$ is a divalent organic group, which may be —O— or —S—, and preferably —O—.

In Chemical Formula 1 above, the $n^1$ may be an integer of 0 to 4, and preferably an integer of 0 or 1.

[Chemical Formula 2]

In Chemical Formula 2 above, the $R^{211}$ to $R^{214}$, $R^{221}$ to $R^{224}$, and $R^{231}$ to $R^{234}$ may each independently be any one selected from the group consisting of a hydrogen atom; a halogen atom; an electron donation group selected from the group consisting of an alkyl group, an allyl group, an aryl group, an amino group, a hydroxyl group, and an alkoxy group; and an electron withdrawing group selected from the group consisting of an alkylsulfonyl group, an acyl group, a halogenated alkyl group, an aldehyde group, a nitro group, a nitroso group and a nitrile group. Since the detailed description of the substituents is the same as the above, a repeated description will be omitted.

The $X^{21}$ and $X^{22}$ may each independently be a single bond or a divalent organic group. The bivalent organic group is a bivalent organic group which attracts electrons or releases electrons, and specifically, may be any one selected from the group consisting of —CO—, —SO$_2$—, —CONH—, —COO—, —CR'$_2$—, —C(CH$_3$)$_2$—, —C(CF$_3$)$_2$—, —(CH$_2$)$_n$—, a cyclohexylidene group, and a fluorenylidene group. At this time, the R' is any one selected from the group consisting of a hydrogen atom, a halogen atom, an alkyl group, and a halogenated alkyl group, and the n may be an integer of 1 to 10. When the $X^{21}$ or $X^{22}$ is a single bond, it is meant that phenyl groups existing on both sides of the X are directly bound, and as a representative example thereof, a biphenyl group may be included.

The $Z^{21}$ is a divalent organic group, which may be —O— or —S—, and preferably —O—.

As described above, the ion exchange membrane is formed of the ion conductor including the hydrophilic region including the repeating unit represented by Chemical Formula 1 above and the hydrophobic region including the repeating unit represented by Chemical Formula 2 above to block vanadium ions due to a smaller ion channel than that of a perfluorinated ion conductor. As a result, a vanadium active material is crossovered due to low vanadium ion permeability when being to the vanadium redo flow battery to solve the problem of lowering the energy efficiency, thereby achieving high energy efficiency.

Particularly, when a ketone group having crystallinity is introduced into the hydrophobic region, the ion conductor has a hydrophobic region having increased durability, thereby further improving the chemical and thermal stability, and the ion conductor may have higher ion-conductivity due to a fine phase separation between the hydrophilic region and the hydrophobic region.

Meanwhile, the hydrophilic region or the hydrophobic region of the ion conductor may further include a repeating unit represented by Chemical Formula 3 below.

[Chemical Formula 3]

In Chemical Formula 3 above, the $X^3$ may be a single bond or a divalent organic group. The bivalent organic group is a bivalent organic group which attracts electrons or releases electrons, and specifically, may be any one selected from the group consisting of —CO—, —SO$_2$—, —CONH—, —COO—, —CR'$_2$—, —(CH$_2$)$_n$—, —C(CH$_3$)$_2$—, —C(CF$_3$)$_2$—, a cyclohexylidene group, a cyclohexylidene group containing an ion conducting group, a fluorenylidene group, and a fluorenylidene group containing an ion conducting group. At this time, the R' is any one selected from the group consisting of a hydrogen atom, a halogen atom, an alkyl group, and a halogenated alkyl group, and the n may be an integer of 1 to 10. When the $X^3$ is a single bond, it is meant that phenyl groups existing on both sides of the X are directly bound, and as a representative example thereof, a biphenyl group may be included.

In Chemical Formula 3 above, the $Z^3$ is a divalent organic group, which may be —O— or —S—, and preferably —O—.

In Chemical Formula 3 above, the $R^{31}$ to $R^{38}$ may each independently be any one selected from the group consisting of a hydrogen atom, a halogen atom, an ion conducting group, an electron donation group, and an electron withdrawing group.

Since the detailed description of the substituents is the same as the above, a repeated description will be omitted.

In Chemical Formula 3 above, the $n^3$ may be an integer of 0 to 4, and preferably an integer of 0 or 1.

More specifically, the hydrophilic region may be represented by Chemical Formula 4 below.

[Chemical Formula 4]

In Chemical Formula 4, the A is an ion conducting group, the $X^1$ and $X^3$ are each independently any one selected from the group consisting of a single bond, —CO—, —SO$_2$—, —CONH—, —COO—, —CR'$_2$—, —(CH$_2$)$_n$—, —C(CH$_3$)$_2$—, —C(CF$_3$)$_2$—, a cyclohexylidene group, a cyclohexylidene group containing an ion conducting group, a fluorenylidene group, and a fluorenylidene group containing an ion conducting group, the R' is any one selected from the group consisting of a hydrogen atom, a halogen atom, an alkyl group, and a halogenated alkyl group, the n is an integer of 1 to 10, the $Z^1$ and $Z^3$ are each independently —O— or —S—, the $R^{11}$ to $R^{16}$ and $R^{31}$ to $R^{38}$ are each independently any one selected from the group consisting of a hydrogen atom, a halogen atom, an ion conducting group, an electron donation group, and an electron withdrawing group, and the $n^1$ and $n^3$ are each independently integers of 0 to 4. Since the more detailed description for the A, $X^1$, $X^3$, $Z^1$, $Z^3$, $R^{11}$ to $R^{16}$, $R^{31}$ to $R^{38}$, $n^1$ and $n^3$ are the same as described above, a repeated description will be omitted.

In addition, the hydrophobic region may be represented by Chemical Formula 5 below.

[Chemical Formula 5]

In Chemical Formula 5 above, the $R^{211}$ to $R^{214}$, $R^{221}$ to $R^{224}$, $R^{231}$ to $R^{234}$, and $R^{31}$ to $R^{38}$ are each independently any one selected from the group consisting of a hydrogen atom, a halogen atom, an electron donation group, and an electron withdrawing group, the $X^{21}$, $X^{22}$ and $X^3$ are each independently any one selected from the group consisting of a single bond, —CO—, —SO$_2$—, —CONH—, —COO—, —C(CH$_3$)$_2$—, —C(CF$_3$)$_2$—, —(CH$_2$)$_n$—, a cyclohexylidene group, and a fluorenylidene group, the R' is any one selected from the group consisting of a hydrogen atom, a halogen atom, an alkyl group, and a halogenated alkyl group, the n is an integer of 1 to 10, the $Z^1$ and $Z^3$ are each independently —O— or —S—, and the $n^3$ is an integer of 0 to 4.

In Chemical Formula 5 above, since the more detailed description for the $R^{211}$ to $R^{214}$, $R^{221}$ to $R^{224}$, $R^{231}$ to $R^{234}$, $R^{31}$ to $R^{38}$, $X^{21}$, $X^{22}$, $X^3$, $Z^1$, $Z^3$, and $n^3$ are the same as described above, a repeated description will be omitted.

In addition, the ion exchange membrane may be represented by Chemical Formula 6 below.

[Chemical Formula 6]

In Chemical Formula 6 above, the A is an ion conducting group, the $X^1$ and $X^3$ are each independently any one selected from the group consisting of a single bond, —CO—, —SO$_2$—, —CONH—, —COO—, —CR'$_2$—, —(CH$_2$)$_n$—, —C(CH$_3$)$_2$—, —C(CF$_3$)$_2$—, a cyclohexylidene group, a cyclohexylidene group containing an ion conducting group, a fluorenylidene group, and a fluorenylidene group containing an ion conducting group, the $X^{21}$ and $X^{22}$ are each independently any one selected from a single bond, —CO—, —SO$_2$—, —CONH—, —COO—, —CR'$_2$—, —C(CH$_3$)$_2$—, —C(CF$_3$)$_2$—, —(CH$_2$)$_n$—, a cyclohexylidene group, and a fluorenylidene group, the R' is any one selected from the group consisting of a hydrogen atom, a halogen atom, an alkyl group, and a halogenated alkyl group, the n is an integer of 1 to 10, the $R^{11}$ to $R^{16}$ and $R^{31}$ to $R^{38}$ are each independently any one selected from the group consisting of a hydrogen atom, a halogen atom, an ion conducting group, an electron donation group, and an electron withdrawing group, the $R^{211}$ to $R^{214}$, $R^{221}$ to $R^{224}$, and $R^{231}$ to $R^{234}$ are each independently any one selected from the group consisting of a hydrogen atom, a halogen atom, an electron donation group, and an electron withdrawing group, and the $n^1$ and $n^3$ are each independently integers of 0 to 4. In Chemical Formula 6 above, since the more detailed description for the A, $X^1$, $R^{11}$ to $R^{16}$, $R^{211}$ to $R^{214}$, $R^{221}$ to $R^{224}$, $R^{231}$ to $R^{234}$, $R^{31}$ to $R^{38}$, $X^{21}$, $X^{22}$, $X^3$, $Z^1$, $Z^{21}$, $Z^3$, $n^1$ and $n^3$ are the same as described above, a repeated description will be omitted.

In Chemical Formula 6 above, the $n^{61}$ and $n^{62}$ are each independently integers of 1 to 100 and preferably 5 to 40. When the $n^{61}$ or $n^{62}$ are less than 1, a phase separation effect of the hydrophilic region and the hydrophobic region is slight, and when the $n^{61}$ or $n^{62}$ are more than 100, it is difficult to control a molecular weight and the liquidity and impregnability of the reinforced composite membrane may be deteriorated.

In Chemical Formula 6 above, the repeating unit derived from the Chemical Formula 3 contained in the hydrophilic region may include an ion conducting group, but the repeating unit derived from the Chemical Formula 3 contained in the hydrophobic region may not include the ion conducting group.

The molar ratio of the repeating units of the hydrophilic region and the hydrophobic region of the ion conductor may be 1:0.5 to 1:10, preferably 1:1 to 1:5, and more preferably more than 1.25 to 1:5. If the molar ratio of the repeating units in the hydrophobic region is less than 0.5, the water content may increase and the dimensional stability and durability may be deteriorated. If the molar ratio is more than 10, the ion-conductivity may be lowered even if the hydrophilic region is even so increased.

The ion conductor may have a weight average molecular weight of 10,000 g/mol to 1,000,000 g/mol, and preferably a weight average molecular weight of 100,000 g/mol to 500,000 g/mol. When the weight average molecular weight of the ion conductor is less than 100,000 g/mol, it is difficult to form a uniform membrane and durability may be deteriorated. When the weight average molecular weight of the ion conductor exceeds 500,000 g/mol, the solubility may be reduced.

The anion conductor is a polymer capable of transferring anions such as hydroxyl ions, carbonate, or bicarbonate, the anion conductor is commercially available in the form of hydroxide or halide (generally, chloride), and the anion conductor may be used in industrial water purification, metal separation, a catalytic process, or the like.

As the anion conductor, a polymer doped with metal hydroxide may be generally used. Specifically, the polymer doped with metal hydroxide may use poly (ether sulfone), polystyrene, a vinyl-based polymer, poly(vinyl chloride), poly(vinylidene fluoride), poly(tetrafluoroethylene), poly (benzimidazole), poly(ethylene glycol), or the like.

The ion conductor may be contained in an amount of 30 to 70 wt % and specifically 40 to 60 wt % with respect to the total weight of the ion exchange membrane. The content of the ion conductor is a reduced content as compared with the case of using a porous support having nanopores as the porous support includes the micropores. If the content of the ion conductor is less than 30 wt %, the ion-conductivity of the ion exchange membrane may be deteriorated, and if the content of the ion conductor exceeds 70 wt %, the mechanical strength and dimensional stability of the ion exchange membrane may be deteriorated.

The ion exchange membrane uses the porous support having the micropores to have sufficient efficiency even when an ion conductor layer is formed with a smaller content. Compared with an ion exchange membrane using a porous support having nanopores in the related art, since the content of the ion conductor may be reduced in the overall ion exchange membrane, it is possible to obtain an effect of reducing a swelling ratio and a dimensional change amount of the ion exchange membrane, thereby improving durability.

Specifically, the porous support acts as a resistance in the ion exchange membrane due to no ion transfer capability. However, in the case of a single ion conductor membrane, since it is difficult to ensure durability by repeating shrinking and expansion under operating conditions of the membrane, the porous support is introduced to be used for ensuring the durability. The porous support having the micropores has a larger pore size than that of the porous support having the nanopores, and thus the porous support acts as a relatively less resistance.

In the porous support having the micropores, since a large amount of ion conductor is already filled in the micropores, the ratio of the ion conductor layer formed on both surfaces of the porous support may be reduced as compared with the porous support having the nanopores, and thus it is possible to reduce the content of the ion conductor in the overall ion exchange membrane. That is, in the ion exchange membrane including the porous support having the micropores, it is possible to reduce the resistance by including the porous support, and to reduce the total content of the ion conductor while maintaining the same ion-conductivity.

The ion exchange membrane may further include an ion conductor layer located on one surface or both surfaces of the porous support. The ion conductor layer may be formed by forming a thin membrane on the surface of the porous support with the ion conductor remaining after filling the pores of the porous support.

The thickness of the ion conductor layer on one surface may be 1 to 30 μm, and specifically 1 to 15 μm. If the thickness of the ion conductor layer is less than 1 μm, it may be difficult to implement the ion conductor layer in the process, and if the thickness exceeds 30 μm, the mechanical strength may be lowered.

The ion exchange membrane according to the embodiment of the present invention includes micropores having a larger size than that of a general porous support, so that a large amount of ion conductor is impregnated into the micropores. As a result, even if the thickness of the surface ion conductor layer is smaller, it is possible to obtain sufficient efficiency, and as the ion conductor layer is very thinly formed, it is possible to manufacture a reinforced composite membrane having a low resistance and advantageous conductivity performance.

At this time, the thickness of the ion conductor layer on one surface may be 1 to 50 length % and preferably 1 to 30 length % with respect to the total thickness of the ion exchange membrane. When the thickness of the ion conductor layer is less than 1 length %, the ion-conductivity of the exchange membrane may be lowered, and when the thickness exceeds 50 length %, the mechanical strength and dimensional stability of the ion exchange membrane may be deteriorated. The thickness ratio of the ion conductor layer on one surface may be calculated by the following Equation 2.

Thickness ratio of ion conductor layer on one surface (length %)=(thickness of ion conductor layer on one surface/total thickness of ion exchange membrane)×100 [Equation 2]

Figure 1:
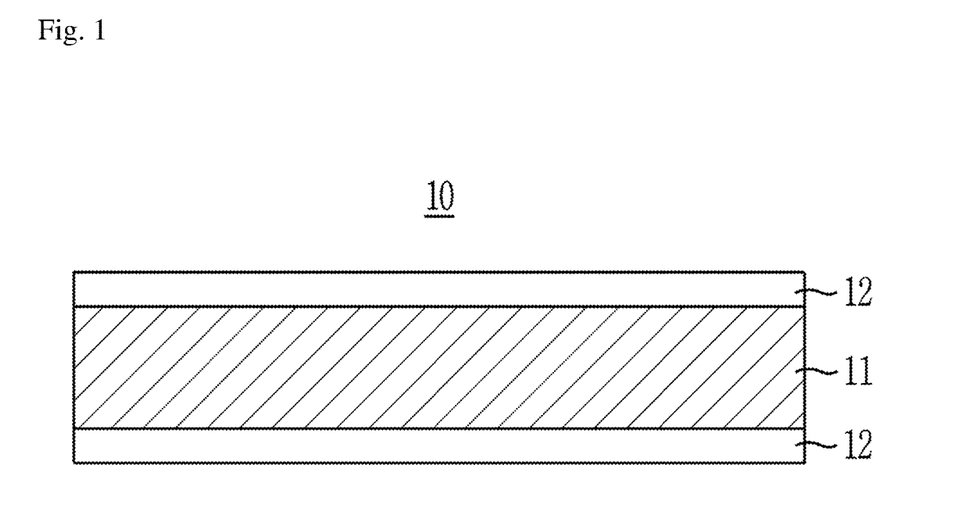
FIG. 1 is a schematic view showing an ion exchange membrane using a porous support having micropores according to the present invention.
Figure 2:
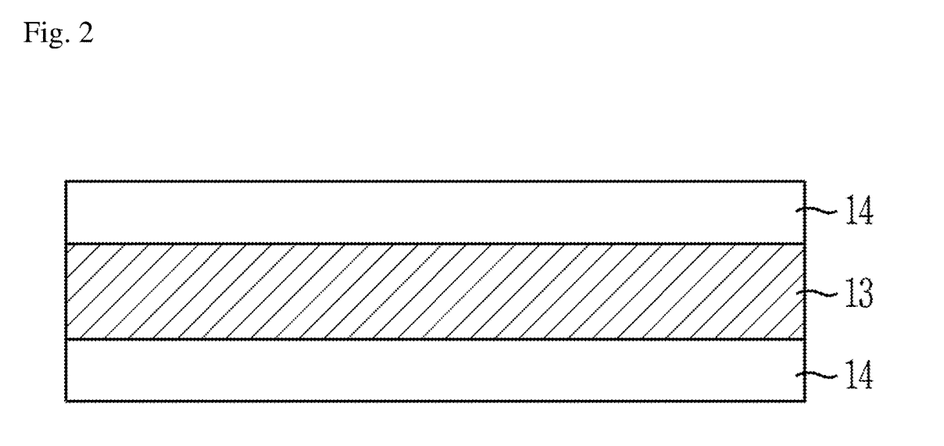
FIG. 2 is a schematic view showing an ion exchange membrane using a porous support having nanopores in the related art.

FIG. 1 is a schematic view showing the ion exchange membrane using the porous support having the micropores according to the present invention and FIG. 2 is a schematic view showing the ion exchange membrane using the porous support having the nanopores in the related art.

Referring to FIGS. 1 and 2, the ion exchange membrane 10 uses the porous support 11 having the micropores so that sufficient efficiency is generated even if the ion conductor layer 12 is formed with a smaller content and a smaller thickness, and the resistance is reduced through the reduction in thickness of the overall ion exchange membrane 10, thereby improving the overall efficiency.

In addition, when the ion exchange membrane 10 using the porous support 11 having the micropores is compared with the ion exchange membrane using the porous support 13 having the nanopores, the content of ion conductor filled in the pores of the porous support 11 may be reduced to obtain an effect of reducing the swelling ratio and the dimensional change amount of the ion exchange membrane 10, thereby improving the durability.

Specifically, the porous supports 11 and 13 act as a resistance in the ion exchange membrane 10 due to no ion transport capability. In the case of manufacturing the ion exchange membrane using the porous support 13 having the nanopores in the related art, the thickness ratio of an ion conductor layer 14 is 30 length % or higher of the entire membrane and the ion conductor layer 14 needs to be formed with a predetermined thickness or higher to have ion-conductivity performance. However, in the case of manufacturing the ion exchange membrane 10 using the porous support 11 having the micropores, since the size of the pore is very large and the area of the resistance is small, the thickness ratio of the ion conductor layer 12 may be reduced as compared with the ion exchange membrane using the nanopores or a support with several micro distribution, the thickness of the overall ion exchange membrane 10 is also reduced to lower the resistance due to the membrane thickness on the system, and the voltage efficiency (V.E) performance is improved, thereby entirely enhancing energy efficiency (E.E) of the energy storage system.

In addition, when the content of the ion conductor is reduced in the ion exchange membrane 10 while ensuring the same ion-conductivity performance, there is an advantage in terms of morphological stability. When the porous support 11 having the micropores is used, the content of the ion conductor is reduced while ensuring the same ion-conductivity, and thus, an effect of reducing the swelling ratio of the ion exchange membrane due to the ion conductor layer 12 is shown and the dimensional stability may be much improved. Particularly, in the redox flow battery, the ion exchange membrane 10 is generally operated while being exposed to an aqueous solution state of an electrolyte containing 1 M $VOSO_4$ and 5 M $H_2SO_4$, so that the morphological stability of the membrane has a considerable advantage in ensuring durability of the system.

A method for manufacturing an ion exchange membrane according to another embodiment of the present invention includes preparing a porous support including a plurality of pores and filling an ion conductor in the pores of the porous support.

First, the porous support including the plurality of pores is prepared. At this time, the porous support is formed to have micropores.

The porous support including the micropores may be prepared by a method for preparing a nonwaven fibrous web, and specifically, the porous support may be prepared by any one method selected from the group consisting of carding, garneting, air-laying, web-laying, melt blowing, spunbonding, and stitch bonding, and preferably, may be prepared by a wet-laying method.

The wet-laying is a process capable of forming a nonwoven fibrous web, and in the wet-laying process, a bundle of small fibers having a length in the range of about 3 mm to about 52 mm is separated and entrained in a liquid supply source, and then embedded on a molding screen under the assistance of a vacuum supply source at all times. As the liquid, water may be generally used. The fibers randomly embedded by the wet-laying are additionally entangled (for example, hydro-entangled), or may be bonded to each other by using, for example, thermal point bonding, spontaneous bonding, hot air bonding, ultrasonic bonding, needle punching, calendering, application of a spray adhesive, or the like. The exemplary wet-laying and bonding processes may refer to, for example, U.S. Pat. No. 5,167,765 (Nielson, etc) and the exemplary bonding process may refer to US Patent Publication No. 2008/0038976 (Berrigan, etc).

Next, the ion conductor is filled in the pores of the porous support to manufacture an ion exchange membrane in a form of a reinforced composite membrane.

The filing of the pores of the porous support with the ion conductor may be generally performed by carrying or impregnating the porous support in a solution containing the ion conductor. In addition, the filing of the pores of the porous support with the ion conductor may be performed by any one method selected from the group consisting of bar coating, comma coating, slot die, screen printing, spray coating, doctor blading, laminating and combinations thereof.

However, in the case of using the porous support having the micropores, when the conventional methods as described above are used, the amount of the ion conductor filled in one pore increases (because the pore size is large), and thus there is a problem in that the porous support is wrinkled or contracted.

Therefore, the filling of the ion conductor in the porous support having the micropores may be preferably performed by using a melt impregnation method. That is, when using the melt impregnation method, the ion conductor may be filled while preventing the porous support from being wrinkled or contracted.

In particular, when a wet impregnation process commonly used is applied to the porous support having the micropores, the porous support having the micropores has a large pore size, so that the content of the solvent filled in the pores increases and a shape of the ion exchange membrane may be deformed during drying. By using the melt impregnation method, the problem may be prevented and the porous support having the micropores may be used to ensure the morphological stability of the ion exchange membrane during manufacturing.

Specifically, in the case of applying the melt impregnation method, the filling of the pores of the porous support with the ion conductor may include preparing the ion conductor in a sheet shape by coating, and melt-impregnating the sheet-shaped ion conductor into the pores of the porous support.

The preparing of the ion conductor in the sheet shape by coating may be performed by preparing a solution or dispersion containing the ion conductor and then coating the prepared solution or dispersion on a substrate.

The solution or dispersion containing the ion conductor may be used by purchasing a commercially available ion conductor solution or dispersion and prepared by dispersing the ion conductor in a solvent. The method of dispersing the ion conductor in the solvent may be used by conventional methods generally known, and thus a detailed description thereof will be omitted.

As the solvent for preparing the solution or dispersion containing the ion conductor, a solvent selected from the group consisting of water, a hydrophilic solvent, an organic solvent, and a mixture of at least one thereof may be used.

The hydrophilic solvent may have at least one functional group selected from the group consisting of alcohol, isopropyl alcohol, ketone, aldehyde, carbonate, carboxylate, carboxylic acid, ether and amide which contain straight or branched saturated or unsaturated hydrocarbons having 1 to 12 carbon atoms as a main chain, which may contain an alicyclic or aromatic cyclic compound as at least a part of the main chain.

The organic solvent may be selected from N-methylpyrrolidone, dimethylsulfoxide, tetrahydrofuran, and mixtures thereof.

In addition, the method of coating the ion conductor on the substrate may be performed by any one method selected from the group consisting of bar coating, comma coating, slot die, screen printing, spray coating, doctor blading, laminating and combinations thereof.

Next, in the melt-impregnating of the prepared sheet-shaped ion conductor into the pores of the porous support, the sheet-shaped ion conductor is disposed on one surface or both surfaces of the porous support, and then may be performed while applying heat and pressure using a hot press and the like.

At this time, the condition of the melt impregnation may be appropriately selected according to the type of the ion conductor, and specifically may be appropriately selected by considering a glass transition temperature of the ion conductor. That is, conditions such as pressure, temperature, and time may be set so that the sheet-shaped ion conductor may be melted and permeated into the micropores of the porous support. However, at this time, when a thermal decomposition temperature of the ion conductor which is a polymer is exceeded, the structure may be broken or the ion conductive performance may be lost, and thus it is preferable to control the conditions of the melt impregnation within a range in which the ion conductor is not damaged.

Specifically, the melt impregnation of the sheet-shaped ion conductor may be performed from the glass transition temperature or higher of the ion conductor to the thermal decomposition temperature or less of the ion conductor, for example, at 150 to 240° C. in a pressure of 1 to 20 MPa. The melt impregnation time may vary depending on the manufacturing length of the ion exchange membrane and the heating means. If the temperature is less than the glass transition temperature (e.g., 150° C.) of the ion conductor, the ion conductor may not be sufficiently dissolved so that the ion conductor may be partially impregnated into the porous support, and if the temperature is more than the thermal decomposition temperature (e.g., 240° C.) of the ion conductor, an ion conducting functional group of the ion conductor, representatively, a sulfonic acid group, may be decomposed.

For example, when the ion conductor is a hydrocarbon-based ion conductor, the glass transition temperature is usually 150° C. to 200° C. or less. Therefore, the melt impregnation of the hydrocarbon-based ion conductor may be performed at 150° C. or higher.

The heating may be applied to any means capable of transferring heat to the ion conductor. Specifically, the heating may be performed by bring a heated roll or a plate-like press into contact with a laminate in which the ion conductor are present on the surface of the porous support and placing the laminate on a heating plate to heat the entire laminate, but the present invention is not limited thereto.

An energy storage device according to yet another embodiment of the present invention includes the ion exchange membrane. Hereinafter, a case where the energy storage device is a redox flow battery or a fuel cell will be described in detail. However, the present invention is not limited thereto, and an ion exchange membrane is also applicable to an energy storage device of a secondary battery type.

In one example of the energy storage device, since the ion exchange membrane has low vanadium ion permeability by blocking vanadium ions due to a small ion channel, it is possible to solve a problem in that a vanadium active material is crossovered when being applied to a vanadium redox flow battery to deteriorate the energy efficiency, thereby achieving high energy efficiency. As a result, the energy storage device may be a redox flow battery.

The redox flow battery may be charged and discharged by supplying a cathode electrolyte and an anode electrolyte to a battery cell including a cathode and an anode arranged to face each other, and the ion exchange membrane disposed between the cathode and the anode.

The redox flow battery may include an all vanadium-based redox battery using a V(IV)/V(V) redox couple as the cathode electrolyte and a V(II)/V(III) redox couple as the anode electrolyte; a vanadium-based redox battery using a halogen redox couple as the cathode electrolyte and a V(II)/V(III) redox couple as the anode electrolyte; a polysulfide bromine redox battery using a halogen redox couple as the cathode electrolyte and a sulfide redox couple as the anode electrolyte; or a zinc-bromine (Zn—Br) redox battery using a halogen redox couple as the cathode electrolyte and a zinc (Zn) redox couple as the anode electrolyte, but in the present invention, the type of the redox flow battery is not limited.

Hereinafter, a case where the redox flow battery is an all vanadium-based redox battery will be described as an example. However, the redox flow battery of the present invention is not limited to the all vanadium-based redox battery.

Figure 3:
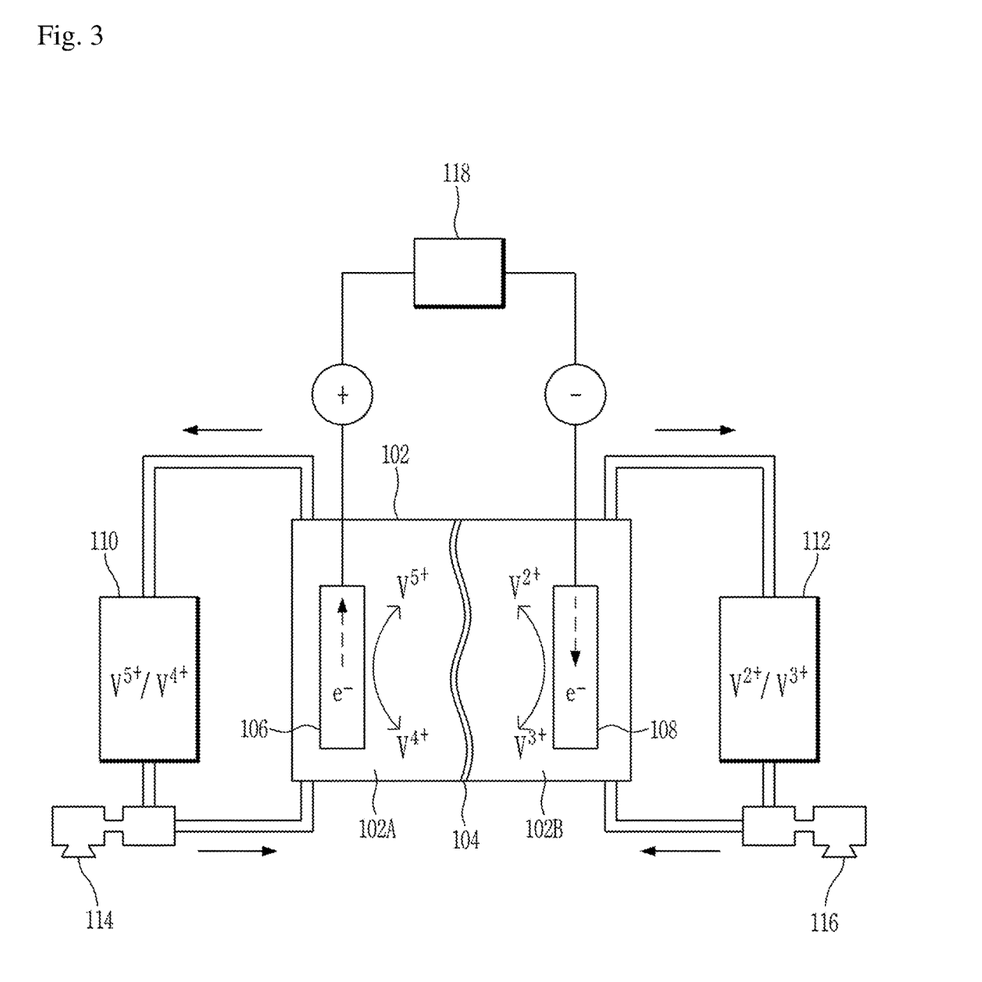
FIG. 3 is a schematic view showing an all vanadium-based redox battery according to an embodiment of the present invention.

FIG. 3 is a schematic view showing the all vanadium-based redox battery.

Referring to FIG. 3, the redox flow battery includes a cell housing 102, an ion exchange membrane 104 installed to divide the cell housing 102 into a cathode cell 102A and an anode cell 102B, and a cathode 106 and an anode 108 located in the cathode cell 102A and the anode cell 102B, respectively.

In addition, the redox flow battery may further include a cathode electrolyte storage tank 110 storing the cathode electrolyte and an anode electrolyte storage tank 112 storing the anode electrolyte.

The redox flow battery includes a cathode electrolyte inlet and a cathode electrolyte outlet at the upper and lower ends of the cathode cell 102A and may include an anode electrolyte inlet and an anode electrolyte outlet at the upper and lower ends of the anode cell 102B.

The cathode electrolyte stored in the cathode electrolyte storage tank 110 is introduced into the cathode cell 102A through the cathode electrolyte inlet by a pump 114 and then discharged from the cathode cell 102A through the cathode electrolyte outlet.

Similarly, the anode electrolyte stored in the anode electrolyte storage tank 112 is introduced into the anode cell 102B through the anode electrolyte inlet by a pump 116, and then discharged from the anode cell 102B through the anode electrolyte outlet.

In the cathode cell 102A, electrons move through the cathode 106 according to the operation of a power source/load 118 to cause the oxidation/reduction reaction of $V^{5+} \leftrightarrow N^{4+}$. Similarly, in the anode cell 102B, electrons move through the anode 108 according to the operation of the power source/load 118 to cause the oxidation/reduction reaction of $V^{2+} \leftrightarrow N^{3+}$. After the oxidation/reduction reaction, the cathode electrolyte and anode electrolyte are circulated to the cathode electrolyte storage tank 110 and the anode electrolyte storage tank 112, respectively.

The cathode 106 and the anode 108 may be formed of any one selected from the group consisting of at least one metal selected from Ru, Ti, Ir, Mn, Pd, Au, and Pt, an oxide of at least one metal selected from Ru, Ti, Ir, Mn, Pd, Au, and Pt (for example, applying an Ir oxide or Ru oxide on a Ti substrate), a carbon composite containing the composite material, a dimensionally stable electrode (DSE) including the composite material, a conductive polymer (for example, an electrically conductive polymer material such as polyacetylene or polythiophene), graphite, glassy carbon, conductive diamond, conductive diamond-like carbon (DLC), a nonwoven fabric made of carbon fibers, and a woven fabric made of carbon fibers.

The cathode electrolyte and the anode electrolyte may include any one metal ion selected from the group consisting of titanium ions, vanadium ions, chromium ions, zinc ions, tin ions, and mixtures thereof.

For example, the anode electrolyte contains vanadium divalent ions ($V^{2+}$) or vanadium trivalent ions ($V^{3+}$) as anode electrolyte ions, and the cathode electrolyte may contain vanadium tetravalent ions ($V^{4+}$) or vanadium pentavalent ions ($V^{5+}$) as cathode electrolyte ions.

The concentration of the metal ions contained in the cathode electrolyte and the anode electrolyte is preferably 0.3 to 5 M.

As the solvent of the cathode electrolyte and the anode electrolyte, any one selected from the group consisting of $H_2SO_4$, $K_2SO_4$, $Na_2SO_4$, $H_3PO_4$, $H_4P_2O_7$, $K_2PO_4$, $Na_3PO_4$, $K_3PO_4$, $HNO_3$, $KNO_3$ and $NaNO_3$ may be used. Since the metal ions which become the cathode and anode active materials are all water-soluble, an aqueous solution may suitably be used as the solvent of the cathode electrolyte and the anode electrolyte. Particularly, when any one selected from the group consisting of sulfuric acid, phosphoric acid, nitric acid, sulfate, phosphate and nitrate is used as the aqueous solution, stability, reactivity and solubility of the metal ions may be improved.

Meanwhile, the ion exchange membrane may also be applied to a membrane-electrode assembly for a fuel cell. Specifically, the membrane-electrode assembly may include an anode electrode and a cathode electrode facing each other, and the ion exchange membrane disposed between the anode electrode and the cathode electrode.

Hereinafter, Examples of the present invention will be described in detail so as to easily implement those skilled in the art. However, the present invention may be embodied in many different forms and are limited to Examples described herein.

Preparation Example: Manufacture of Ion Exchange Membrane

Preparation Example 1: Preparation of Sulfonated Polyether Sulfone-Ether Ketone Block Copolymer An ion conductor was prepared using the following Reaction Formula 3.

[Reaction Formula 3]

1-1) Preparation of Hydrophilic Region 3,3-disulfonated-4,4'-dichlorodiphenyl sulfone (SD-CDPS) and bisphenol A were reacted in the presence of potassium carbonate using a DMAc/Toluene co-solvent at 160 to 180° C. for 30 hours, ejected and washed with purified water, and then subjected to hot air drying.

1-2) Preparation of Hydrophobic Region

Bisphenol A and 1,3-bis(4-chlorobenzoyol)benzene were reacted in the presence of potassium carbonate using a DMAc/Toluene co-solvent at 160 to 180° C. for 30 hours, ejected and washed with purified water, and then subjected to hot air drying.

1-3) Preparation of Polymer

The prepared hydrophilic region and hydrophobic region were reacted in the presence of potassium carbonate using a DMAc/Toluene co-solvent at 160 to 180° C. for 30 hours, ejected and washed with purified water, and then subjected to hot air drying.

1-4) Preparation of Ion Conductor

The prepared polymer was dissolved in dichloromethane, and slowly added to a 5-fold excess amount of chlorosulfonic acid/DCM solution and then stirred for 24 hours. The solution was discarded and the precipitated solid was washed with the purified water and then subjected to hot air drying.

Preparation Example 2: Manufacture of Sheet-Shaped Ion Conductor

The polymer prepared in Preparation Example 1 was dissolved in 20 wt % of DMAc and then formed as a membrane to prepare a sheet-shaped ion conductor.

Preparation Example 3: Manufacture of Ion Exchange Membrane

Figure 5:
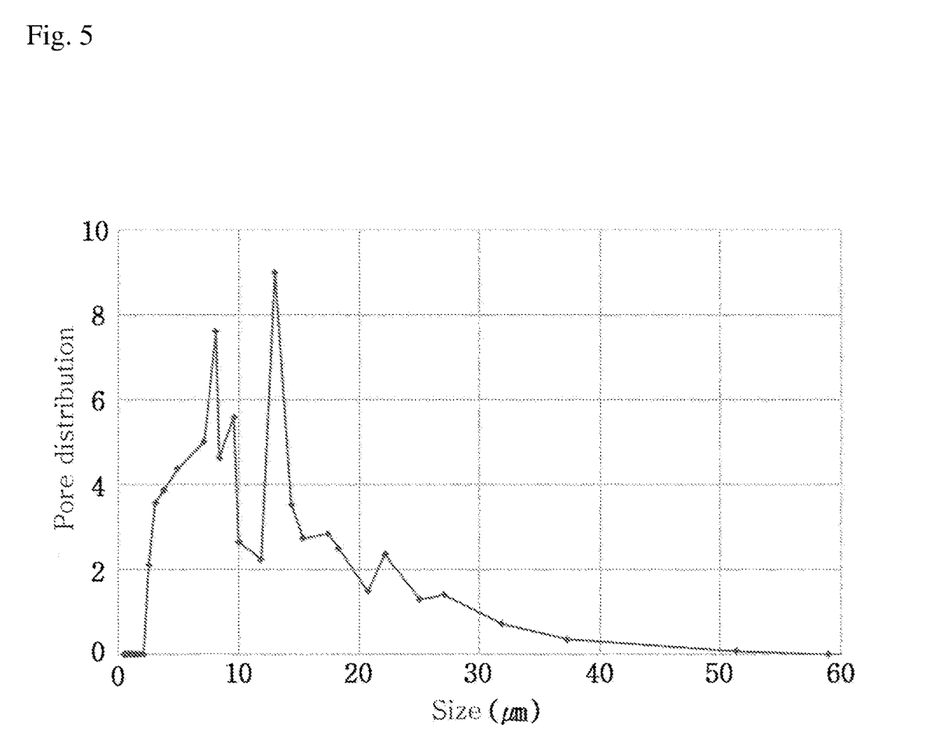
FIG. 5 is a graph showing a pore distribution of a porous support according to Preparation Example 3 of the present invention.

A porous support having micropores made of polyphenylene sulfide (PPS) was prepared by a wet-laying method. The prepared porous support had a basic weight of 19.4 g/m², a porosity of 62%, and a thickness of 34 μm, and was dispersed with micropores having a size of 1 to 1000 μm, and a volume of pores having a size of 31 μm or higher among the micropores was 3 vol % with respect to the total volume of the pores. The average size of the micropores was 14.0603 μm and the maximum size was 657.8279 μm. The pore distribution (vol %) for the pore size (μm) of the prepared porous support was measured by a CFP method, and the result was shown as a graph in FIG. 5.

The sheet-shaped ion conductor prepared in Preparation Example 2 was melt-impregnated at 180° C. for 0.5 hour under the prepared porous support of 1 MPa and dried in a vacuum of 80° C. for 12 hours to manufacture an ion exchange membrane in the form of a reinforced composite membrane.

Comparative Preparation Example 1: Manufacture of Ion Exchange Membrane

Polyamic acid was dissolved in dimethylformamide to prepare 5 L of a spinning solution of 480 poise. The prepared spinning solution was transferred to a solution tank and supplied and spinned to a spinning chamber having 20 nozzles and a high voltage of 3 kV through a metering gear pump to prepare a nanofiber precursor web. At this time, the solution supply amount was 1.5 ml/min. The prepared nanofiber precursor web was heat-treated at 350° C. to prepare a porous support (porosity: 80 vol %) having nanopores.

The porous support prepared above was impregnated by coating an ion conductor solution prepared by dissolving 20 wt % of the polymer prepared in Preparation Example 1 in DMAc, and then dried in a vacuum of 80° C. for 12 hours to form an ion exchange membrane in the form of a reinforced composite membrane. At this time, the weight per unit area of the polyimide nanofiber was 6.8 gsm, and the basic weight of the polymer was 40 g/m².

Comparative Preparation Example 2: Manufacture of Ion Exchange Membrane

As Comparative Example 2, Nafion 212 manufactured by DuPont, which was a commercially available ion exchange membrane, was used as a fluorine-based ion exchange membrane.

Comparative Preparation Example 3: Manufacture of Ion Exchange Membrane

Figure 6:
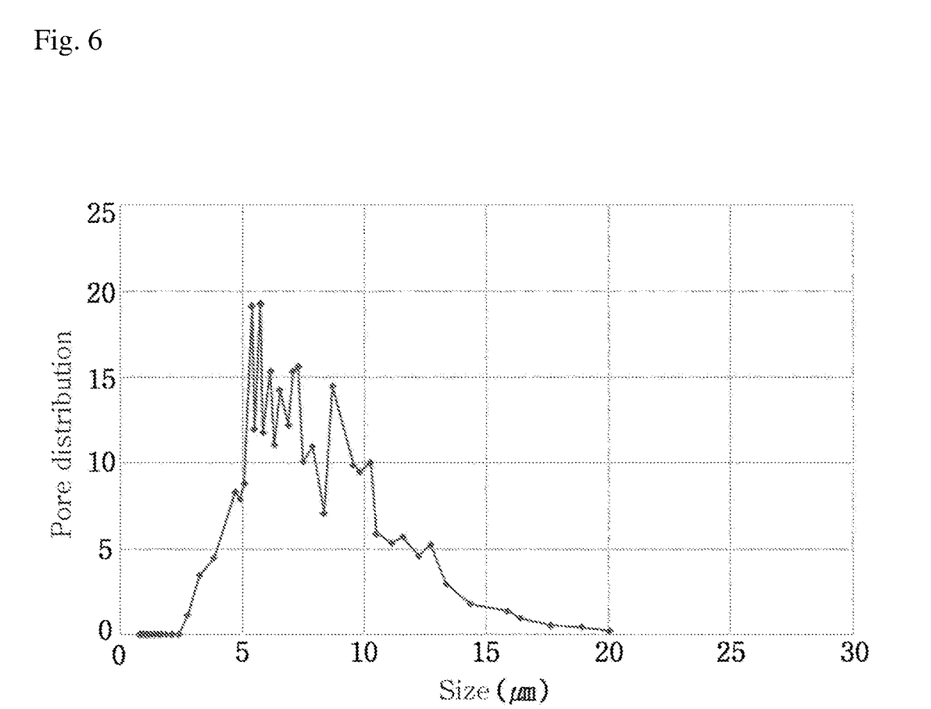
FIG. 6 is a graph showing a pore distribution of a porous support according to Comparative Preparation Example 3 of the present invention.

Comparative Example 3 was prepared in the same manner as in Preparation Examples 1 to 3, but pores having a micropores size of less than 31 μm were dispersed. The average size of the micropores was 8.3017 μm and the maximum size was 25.9855 μm. The pore distribution (vol %) for the pore size (μm) of the used porous support was measured by a CFP method, and the result was shown as a graph in FIG. 6.

Experimental Example: Measurement of Performance of Prepared Ion Exchange Membrane With respect to ion exchange membranes in the form of the reinforced composite membranes prepared in Preparation Example 3 (Example 1) and Comparative Preparation Examples 1 to 3 (Comparative Examples 1 to 3), a swelling ratio, ion-conductivity and energy efficiency (EE) in the energy storage system (VRFB) were measured and the results were shown in Table 1.

The swelling ratio was measured by measuring the thickness and area of the ion exchange membrane after immersing the prepared ion exchange membrane in distilled water at 80° C. for 24 hours and taking out the wet ion exchange membrane, measuring the thickness and area of the ion exchange membrane after drying the ion exchange membrane in a vacuum state of 80° C. for 24 hours, and then measuring a swelling ratio to the thickness and a swelling ratio to the area by putting a thickness $T_{wet}$ and an area $L_{wet}$ in a wet state of the ion exchange membrane and a thickness $T_{dry}$ and an area $L_{dry}$ in a dry state of the ion exchange membrane into Equations 3 and 4 below.

$$(T_{wet}-T_{dry}/T_{dry}) \times 100 = \Delta T \text{ (swelling ratio to thickness, \%)} \quad \text{[Equation 3]}$$

$$(L_{wet}-L_{dry}/L_{dry}) \times 100 = \Delta L \text{ (swelling ratio to area,\%)} \quad \text{[Equation 4]}$$

Figure 4:
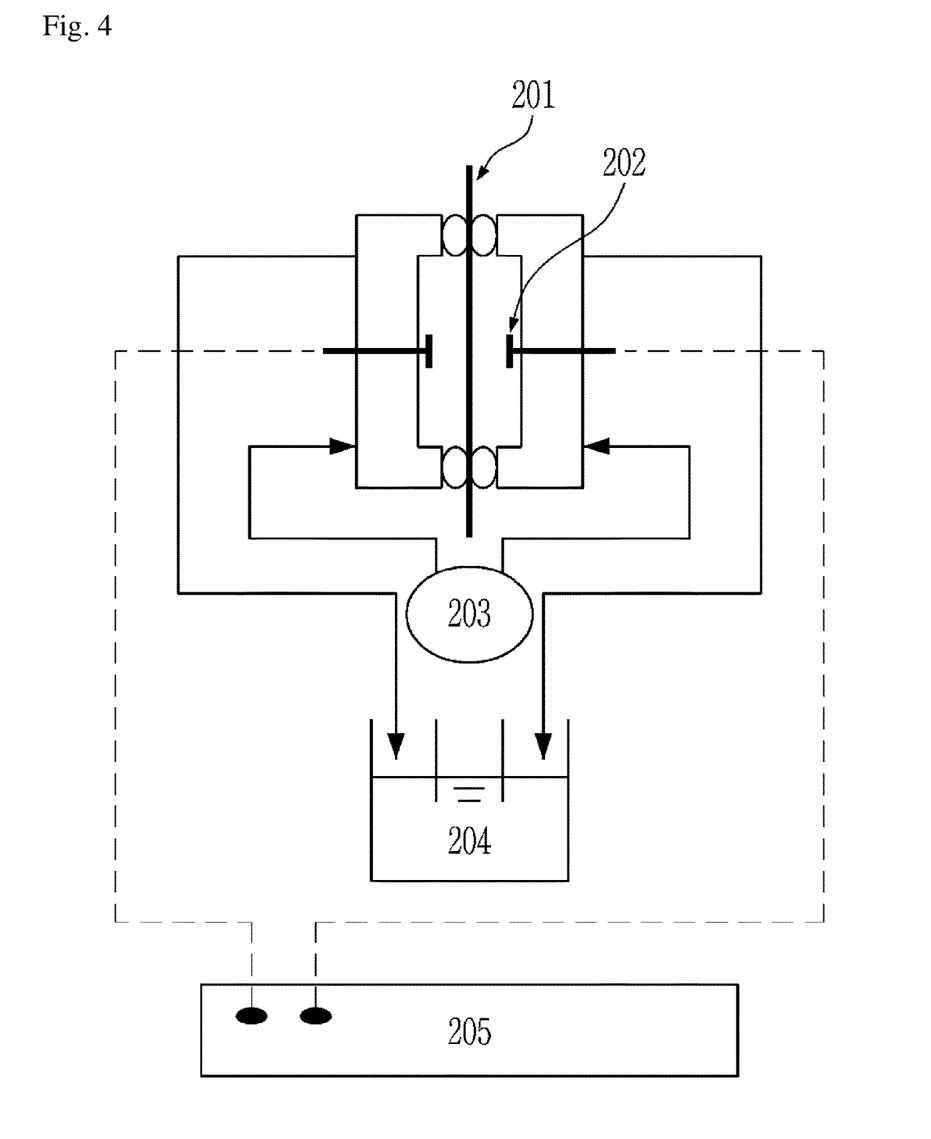
FIG. 4 is a schematic view showing a device used for measuring the resistance of a membrane in Experimental Example of the present invention.

The ion-conductivity was calculated by measuring the resistance of the membrane in 1 M $H_2SO_4$ using equipment in the following FIG. 4 (201: ion exchange membrane, 202: electrode, 203: pump, 204: 1 M $H_2SO_4$, and 205: LCR meter).

The membrane resistance was calculated by the following Equation 5, and the effective area of the membrane was 0.75 $cm^2$.

$$\text{Membrane resistance } (R)=(R1-R2)\times(\text{effective area of membrane}) \quad \text{[Equation 5]}$$

Here, $R_1$ was a resistance [Ω] when the membrane was injected, and $R_2$ was a resistance [Ω] when the membrane was not injected.

The ion-conductivity was calculated by the following Equation 6.

$$\text{Ion-conductivity } (S/cm)=1/R \times t \quad \text{[Equation 6]}$$

Here, R was a membrane resistance [[Ω]·$cm^2$], and t was a membrane thickness [cm].

The energy efficiency (EE) in the energy storage system (VRFB) constituted the following device, and the electrochemical characteristics were measured.

An apparatus for measuring the energy efficiency was constituted by a unit cell of 25 $cm^2$ in an electrode area, two aqueous solution tanks, and a pump in order to measure electrochemical characteristics in the VRFB. As a cathode solution, 30 mL of a solution (aqueous solution of tetravalent vanadium) containing 2 M $VOSO_4$ and 3 M $H_2SO_4$ was used, and as an anode solution, an aqueous solution (aqueous solution of trivalent vanadium) in which the cathode solution was electrolytically reduced was used. The amount of the cathode solution was slightly larger than that of the anode solution to suppress overcharge. The unit cell for measurement was constituted by a membrane to be measured, a carbon felt, and a current collector. A constant potential/constant current meter was used for charge/discharge of the unit cell for measurement, and the charge/discharge current density was measured at 60 mA/$cm^2$. In addition, the charging/discharging of the unit cell was performed in a cut-off manner by setting a charging voltage to 1.6 V and a discharging voltage to 1.0 V, and performed five times, and then the current efficiency (CE), voltage efficiency (VE) and energy efficiency (EE) were calculated by using the following Equation 7.

$$CE=Q_D/Q_C$$

$$VE=E_{AD}/E_{AC}$$

$$EE=CE \times VE \quad \text{[Equation 7]}$$

Here, $Q_C[C]$ and $Q_D[C]$ are coulomb amounts at charging and discharging, and $E_{AC}[V]$ and $E_{AD}[V]$ are cell voltages at charging and discharging.

TABLE 1

|  | Example (Preparation Example 3) | Comparative Example 1 (Comparative Preparation Example 1) | Comparative Example 2 (Fluorine-based ion exchange membrane) | Comparative Example 3 (Comparative Preparation Example 3) |
| --- | --- | --- | --- | --- |
| CE (%) | 96.8 | — | — | 97.8 |
| VE (%) | 94.7 | — | — | 89.9 |
| EE (%) | 91.6 | 86.3 | 83.4 | 87.9 |
| Swelling ration (%) | 11 | 20 | 24 | 15 |
| Ion-Conductivity (S/cm) | $1.8 \times 10^{-1}$ | $1.7 \times 10^{-1}$ | $8.1 \times 10^{-2}$ | $1.8 \times 10^{-1}$ |
| Thickness ratio of ion conductor layer[1] | 50 length % | 65 length % | — | 55 length % |

[1] The thickness ratio of the ion conductor layer is a sum of thickness ratios of two ion conductor layers formed on both surfaces of the porous support.

1) The thickness ratio of the ion conductor layer is a sum of thickness ratios of two ion conductor layers formed on both surfaces of the porous support.

Referring to Table 1 above, the ion exchange membrane exhibited a high level of ion-conductivity performance by manufacturing a reinforced composite membrane using a porous support having micropores and a membrane thickness was reduced by relatively increasing a thickness of the ion conductor layer, and as a result, the energy efficiency on the energy storage system was improved.

In addition, the swelling ratio of the ion exchange membrane was reduced, and the dimensional stability was greatly improved, and as a result, it may be expected to improve the durability in the energy storage system (VRFB).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

EXPLANATION OF REFERENCE NUMERALS AND SYMBOLS

10: Ion exchange membrane
11, 13: Porous support
12, 14: Ion conductor layer
102: Cell housing
102A: Cathode cell
102B: Anode cell
104: Ion exchange membrane
106: Cathode
108: Anode
110: Cathode electrolyte storage tank
112: Anode electrolyte storage tank
114,116: Pump
118: Power/load
201: Ion exchange membrane
202: Electrode
203: Pump
204: 1M H2SO4
205: LCR meter

INDUSTRIAL APPLICABILITY

An ion exchange membrane, a method for manufacturing the same, and an energy storage device including the same according to the present invention includes a porous support including a plurality of pores and an ion conductor filling the pores of the porous support, in which the porous support includes micropores having a size of 31 to 1000 μm and is a promising material in energy/environment/electric-electronic fields capable of having high charge/discharge cycle durability, high ion-conductivity, and excellent chemical and thermal stability and achieving high energy efficiency in the case of being applied to an energy storage device such as a vanadium redox inflow battery.

The invention claimed is:
1. An ion exchange membrane comprising:
a porous support including a plurality of pores; and
an ion conductor filling the pores of the porous support,
wherein the porous support includes micropores having a size of 31 to 1000 μm, and wherein the micropores having a size of 31 to 1000 μm constitute 1 to 20% of the total volume of the plurality of pores.

2. The ion exchange membrane of claim 1, wherein a porosity of the porous support is 45% or higher.
3. The ion exchange membrane of claim 1, wherein a thickness of the porous support is 1 to 200 μm.
4. The ion exchange membrane of claim 1, wherein the ion conductor is contained with 30 to 70 wt % with respect to the total weight of the ion exchange membrane.
5. The ion exchange membrane of claim 1, further comprising:
an ion conductor layer located on one surface or both surfaces of the porous support,
wherein a thickness of the ion conductor layer on one surface is 1 to 30 μm.
6. The ion exchange membrane of claim 5, wherein the thickness of the ion conductor layer on one surface is 1 to 50 length % with respect to the total thickness of the ion exchange membrane.
7. The ion exchange membrane of claim 1, wherein the porous support is formed of a plurality of fibers randomly oriented.
8. A method for manufacturing the ion exchange membrane of claim 1 comprising:
preparing a porous support including a plurality of pores; and
filling an ion conductor in the pores of the porous support,
wherein the porous support includes micropores having a size of 31 to 1000 μm, and wherein the micropores having a size of 31 to 1000 μm constitute 1 to 20% of the total volume of the plurality of pores.
9. The method for manufacturing the ion exchange membrane of claim 8, wherein the preparing of the porous support is performed by any one method selected from the group consisting of carding, garneting, air-laying, wet-laying, melt blowing, spunbonding, and stitch bonding.
10. The method for manufacturing the ion exchange membrane of claim 8, wherein the filling of the ion conductor in the pores of the porous support includes
preparing the ion conductor in a sheet shape by coating, and melt-impregnating the sheet-shaped ion conductor into the pores of the porous support.
11. The method for manufacturing the ion exchange membrane of claim 10, wherein the melt-impregnating is performed at 150 to 240° C. in a pressure of 1 to 20 MPa.
12. An energy storage device comprising the ion exchange membrane according to claim 1.
13. The energy storage device of claim 12, wherein the energy storage device is a fuel cell.
14. The energy storage device of claim 12, wherein the energy storage device is a redox flow battery.

* * * * *